United States Patent [19]

Primich

[11] Patent Number: 4,633,747
[45] Date of Patent: Jan. 6, 1987

[54] SHEET MATERIAL SLITTER
[75] Inventor: Theodore Primich, Merrillville, Ind.
[73] Assignee: Gary Steel Products Corp., Gary, Ind.
[21] Appl. No.: 781,769
[22] Filed: Sep. 30, 1985
[51] Int. Cl.[4] .......................... B26D 1/24; B26D 3/08
[52] U.S. Cl. ......................................... 83/732; 83/499
[58] Field of Search ................ 83/499, 500, 436, 418, 83/422, 732

[56] References Cited
U.S. PATENT DOCUMENTS

| | | | |
|---|---|---|---|
| 4,033,217 | 7/1977 | Flaum et al. | 83/499 X |
| 4,144,786 | 3/1979 | Beard et al. | 83/732 |
| 4,215,609 | 8/1980 | Coburn et al. | 83/499 X |
| 4,318,322 | 3/1982 | Russell | 83/732 X |

Primary Examiner—Horace M. Culver
Attorney, Agent, or Firm—Burmeister, York, Palmatier, Hamby & Jones

[57] ABSTRACT

An elongated strip of sheet material is transported over a frame and along a transversely movable carriage on which upper and lower circular rotary cutting knives are mounted to slit the strip longitudinally into a desired portion to be processed immediately and a remnant portion for later use. The free edge of the desired portion is urged against a longitudinal guide, adjustably secured to the carriage, for adjusting the width of the desired portion. The strip is urged against the guide by a vertical crab wheel, locatable against the strip, and disposed at a slight acute angle to the longitudinal direction of the strip. The carriage and the guide are freely movable in a transverse direction to accommodate non-linearities in the strip.

16 Claims, 9 Drawing Figures

SHEET MATERIAL SLITTER

The present invention relates to devices for cutting or slitting one or more strips of material from an elongated wider sheet of material. In particular, the present invention relates to a sheet metal slitter capable of directly feeding a processing line.

Sheet metal is generally produced in long strips which are wound in a coil. The width of the coil is almost always greater than the width of the strip required for any particular processing line. Different products require strips of different widths, and accordingly, it is conventional practice to split the elongated strip of material from the coil into a plurality of narrower strips, often of different widths. Commercial slitters generally utilize a rotary knife which produces the slit as the strip moves down a slitting line. Slitting lines generally use an uncoiler for dispensing the strip from the coil of material, a slitter, and generally a recoiler to wind up one or more of the smaller strips produced by the slitter. Conventional coil slitting is described in a book by John W. Rogers and William H. Millan entitled *Coil Slitting* published by the Corinthian Press in 1972.

Most industrial plants wind the narrower strips of sheet metal produced by the slitter into coils of the desired widths and store these coils until needed on the processing line. At this time, the narrower coils are placed upon an uncoiler, or payoff reel, and the narrower strip is fed from the coil to the particular processing line. This practice has the disadvantage of requiring multiple handling and storage of narrower coils, and further requires rewinding of a narrow strip which places a limitation on the permissable width of a narrow strip. Various efforts have been made in the past to overcome the deficiencies of such slitters as described in U.S. Pat. No. 4,422,587 of the present inventor entitled MACHINE FOR SLITTING STRIPS OF SHEET MATERIAL. In that patent, the payoff reel is positioned on a mandrel with a vertical axis, and the strip of material is maintained vertically as it passes a cutting head. The desired strip is severed from the top of the elongated strip and may be passed directly to a production facility or processing line. The remnant strip is wound on a second vertical mandrel.

The slitter disclosed in U.S. Pat. No. 4,422,587 functions only on strips which can be positioned vertically and depends upon gravity to maintain the location of the cutting knives with respect to the upper edge of the strip. Most sheet metal processing lines work upon horizontally disposed strips of sheet metal and utilize horizontal roller tables and the like to transport the strip along the line. While the vertically disposed strip of the slitter of U.S. Pat. No. 4,422,587 can be reoriented horizontally in most cases, the slitter disclosed in that patent cannot be inserted in a horizontal line without reorienting the strip.

Prior to the slitting machine disclosed in U.S. Pat. No. 4,422,587, conventional slitters utilized rotary cutting knives mounted on a pair of confronting rotatable mandrels, the knives being precisely positioned on the mandrel by intervening spacers. To adjust the knives generally required disassembly of the mandrel and reassembly of the knives and spacers. Generally, a scrap strip was cut from one or both edges of the elongated strip of sheet metal and discarded, the retained strip being cut by two pairs of rotary knives and having a width determined by the distance between one pair of knives and the other pair of knives. The slitter of U.S. Pat. No. 4,422,587 made it possible to utilize the edge strip by providing a fixed distance between the edge of the strip and the cutting plane of the pair of knives, but only in a vertically disposed slitter. It is an object of the present invention to provide a horizontally disposed slitter in which the distance between one edge of the elongated strip of sheet material and the plane of the cutters determines the width of the retained or desired strip.

In many slitting operations, the retained or desired strip has a width less than half of the original or parent strip, and the remnant strip is wound onto a mandrel for storage and later use. The remnant strip must be moved and fed through the slitter a second time to be slit to the desired width. It is an object of the present invention to collect the remnant strip in a coil when processing the parent strip and directly transporting the desired strip to the processing line for further processing, and to thereafter reverse wind the remnant strip to the payoff reel of the slitter so that it may be processed without significant additional handling.

SUMMARY OF INVENTION

In accordance with the present invention, the slitter has a frame with a horizontal surface for supporting the elongated strip of sheet material as it is transported through the slitter from the payoff reel. A carriage containing a pair of circular cutting knives is mounted vertically on the frame with one circular knife above and one circular knife below the horizontal surface of the frame. The carriage is secured to a guide which is adapted to ride on one edge of the elongated strip as it is transported through the slitter, and the distance between the cutting plane of the circular knives and the guide is fixed and determines the width of the strip produced. The slitter is provided with means for urging and maintaining the edge of the elongated strip in abutment with the guide, and in a preferred construction, that means includes a crab wheel mounted vertically on the frame and rotatable with respect to the frame, but disposed at a slight acute angle to the axis of translation of the elongated strip.

In a preferred construction, the guide and carriage for the circular cutting knives are adjustably locked in position with respect to each other, thus readily permitting selection of the width of the strip produced. Further, the guide and carriage are mounted on the frame for free translation along an axis normal to the cutting plane of the circular knives. As a result, nonlinear elongated strips of sheet material may readily be accommodated and slit.

DESCRIPTION OF DRAWINGS

A preferred construction of a slitter constructed according to the present invention is shown in the attached drawings, in which.

DESCRIPTION

Figure 1:
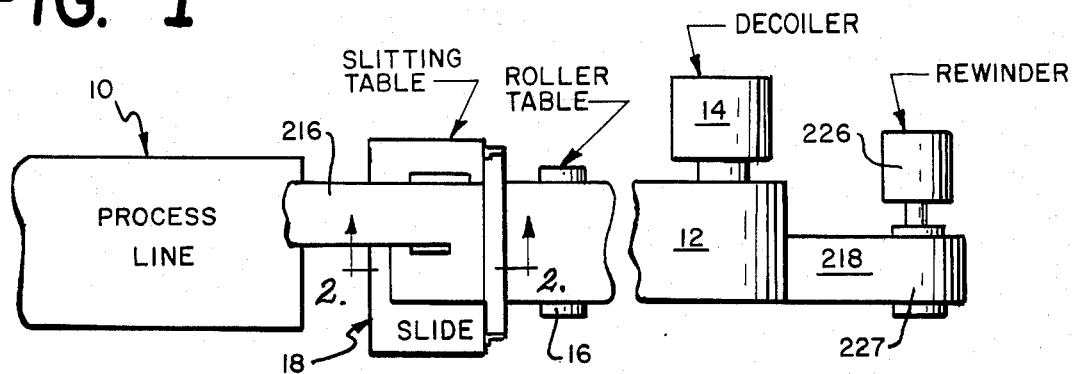
FIG. 1 is a plan view of a sheet metal processing line incorporating a slitting table embodying the present invention.

Conventionally, sheet metal products are made from blanks or strips of sheet metal which are processed in a process line, such as the process line 10 of FIG. 1. The sheet metal is provided from a coil 12 which is mounted on a decoiler 14. The sheet metal is transported from the decoiler 14 to the process line 10 across a roller table 16. If the width of the sheet of metal from the coil 12 is wider than required for the process line 10, a slitter or slitting table 18 is used between the process line 10 and the decoiler 14, and FIG. 1 illustrates a slitting table 18 constructed according to the present invention mounted between the roller table 16 and the process line 10. For convenience, the feed side or input side of the slitter will be referred to as the "front" side.

The slitting table 18 is illustrated in FIGS. 2 through 7, and has a frame 20 with a pair of back legs 22 and 24 which are interconnected to a pair of shorter front legs 26 and 28 by a pair of lower side beams 30 and 32. The back legs 22 and 24 are interconnected by a lower back beam 34, a central back beam 36, and an upper back beam 38. The front legs 26 and 28 are interconnected by a front lower beam 40.

Figure 2:
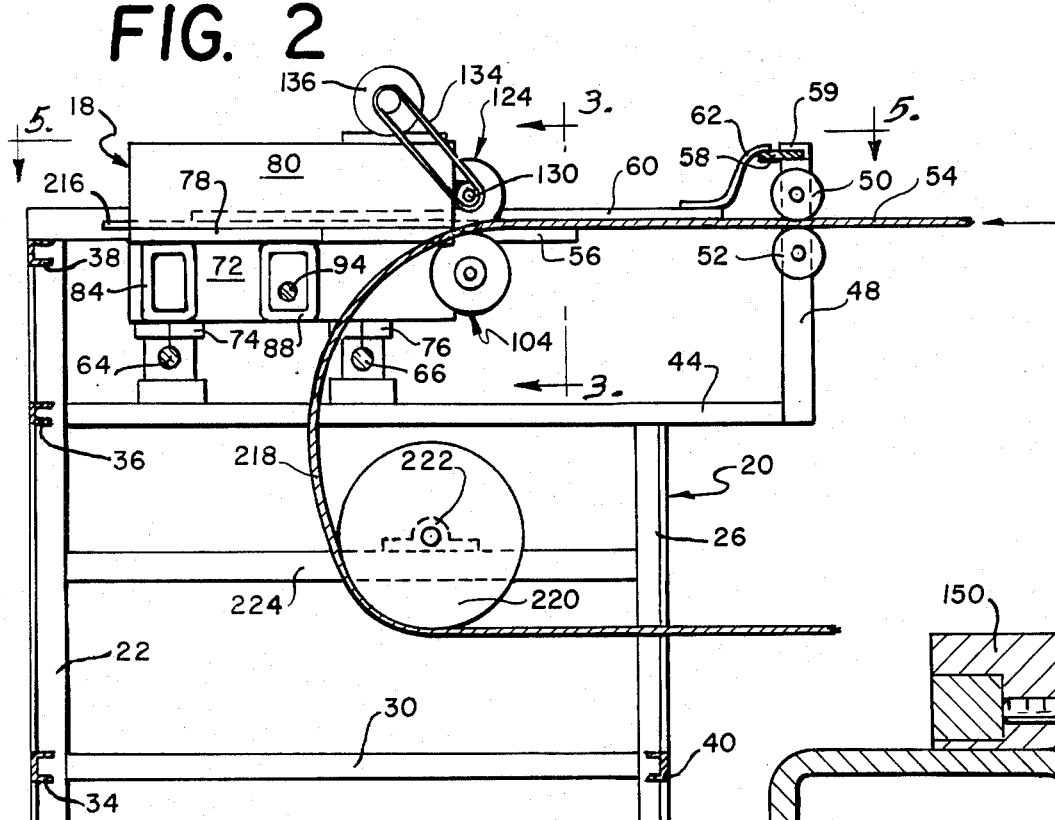
FIG. 2 is a sectional view taken along the line 2—2 of FIG. 1.

The frame 10 is also provided with a pair of horizontal arms 42 and 44 which extend from the central back beam 36 forwardly of the front legs 26 and 28. A pair of vertical risers 46 and 48 extend upwardly from the forward end of the arms 42 and 44, respectively, and rotatably support a pair of parallel horizontal rollers 50 and 52 which are disposed adjacent to each other at the horizontal level for feeding the elongated strip into the slitter 18 for slitting. FIG. 2 illustrates the elongated strip at 54 being fed horizontally into the slitter, although it should be recognized that the strip may be at an angle to the horizontal as it approaches the rollers 50 and 52.

The upper back beam 38 supports a plurality of flat horizontal narrow plates 56 which extend outwardly from the upper back beam 38 toward the rollers 50 and 52. A bar 58 is mounted on the risers 46 and 48 above the roller 50 and back of the risers 46 and 48 by means of brackets 59. A second plurality of elongated flat plates 60 are pivotally attached by flexible strips 62 to the bar 58, and the end portion of each of the plates 60 opposite the bar 58 rests upon one of the plates 56. The strip 54 to be processed is translated upon the plates 56 and between the plates 56 and 60, thereby preventing the elongated sheet from vibrating as it passes through the slitter. The plates 56 form a portion of the means by which the elongated strip of sheet metal is maintained in a horizontal position.

A pair of elongated linear rods 64 and 66 are mounted parallel to each other on the arms 42 and 44 by means of mounting blocks 68. The rod 64 is disposed parallel to and forward of the upper back beam 38, and the rod 66 is disposed generally centrally between the back legs 22, 24 and front legs 26, 28. The rods 64 and 66 translatably support a carriage 70 which carries the circular knives or cutters which are described hereafter.

The carriage 70 is illustrated in FIGS. 2 through 5 and has a lower hollow rectangular tube 72 which carries on its lower surface two spaced mounting blocks 74 and 76. The mounting blocks 74 and 76 have circular channels 77 extending therethrough, and the channels 77 of the blocks 74 and 76 accommodate the rods 64 and 66, respectively. The upper surface of the rectangular tube 72 carries a rigid rectangular plate 78, the plate 78 extending outwardly from the one side of the rectangular tube 72. A second hollow rectangular tube 80 equal in length to the rectangular tube 72 is mounted with its lower side on the upper side of the plate 78, and the second rectangular tube 80 is disposed parallel to the first rectangular tube 72. The tubes 72 and 80 are equally spaced on opposite sides of a plane 82 which is disposed normal to the rods 64 and 66, the plane 82 being the cutting plane of the carriage 70.

A hollow rectangular tube or stub 84 is mounted at its upper surface on the lower surface of the plate 78 and extends from one side of the lower tube 72 along the rear edge of the plate 78 directly above the rod 64. The lower side of the back tube 84 carries a third mounting block 86 which, like the mounting block 74, accommodates the rod 64. The three mounting blocks 74, 76 and 86 are effective to mount the carriage 70 on the frame 20 and to permit translation of the carriage along the rods 64 and 66.

The carriage 70 also has a hollow rectangular front tube or stub 88 which extends outwardly from the lower tube 72 parallel to the back tube 84. The front tube 88 is mounted on the underside of the plate 78 adjacent to the forward edge thereof. The tubes 72, 80, 84 and 88 are all hollow rectangular tubes, and the front tube 88 carries a nut plate 90 at the end thereof, the nut plate having a threaded aperture 92 engaging an elongated screw 94 which extends through the front tube 88 and an opening 95 in the lower tube 72. The screw 94 carries a wheel 96 for adjustment of the cutting width, as will be described hereinafter.

The lower rectangular tube 72 and upper rectangular tube 80 terminate in a common vertical plane parallel to the rods 64 and 66 and disposed between the rod 66 and the rollers 50 and 52. The lower tube 72 has a bearing mounting plate 98 secured in the open end of the hollow rectangular lower tube 72, and a pair of aligned bearing assemblies 100 are mounted on the bearing mounting plate 98. Each of the bearing assemblies 100 comprise a roller bearing assembly 101 mounted within a housing 103. The bearing assemblies 100 rotatably mount a shaft 102 which carries the lower circular knife 104. The circular knife 104 has a cylindrical disc 106 mounted between a stripping disc 108 and a hub 110. The assembly is secured in place by means of a collar 112, washer 114 and lock nut 116. As will be apparent from FIG. 3, the lower circular knife 104 extends from the lower rectangular tube 72 in a direction toward the upper rectangular tube 80 and the cutting plane 82 is defined as the interface between the cylindrical disc 106 and stripping disc 108.

In like manner, the end of the upper tube 80 is provided with a bearing mounting plate 118 and a pair of bearing assemblies 120 are mounted on the mounting plate 118. The bearing assemblies 120 journal a second shaft 122 and the shaft carries an upper circular knife 124. The circular knife 124 is disposed on the side of the bearing assemblies 120 confronting the cutting plane 82, thereby positioning the upper circular knife 124 in cutting relation with the lower circular knife 104. The upper circular knife has a second cylindrical disc 126 which confronts the stripping disc 108 of the lower cylindrical knife 104. In like manner, the upper circular knife 124 has a second stripping disc 128 which directly confronts the cylindrical surface of the disc 106, and the cutting plane 82 is disposed at the interface between the second cylindrical disc 126 and the second stripping disc 128. The lower circular knife 104 and the upper circular knife 124 are identical in construction.

The second shaft 122 extends outwardly from the bearing assemblies 120 on the side opposite the upper circular knife 124. An assembly 130 is mounted on the end of the shaft 122 and has a one-way roller clutch with the inner race thereof secured on the shaft 122 and an outer race which carries a pinion gear. The assembly 130 is coupled to a pinion gear 132 by a chain 134, and the pinion gear 132 is mounted on the shaft of an electric motor 136. Actuation of the electric motor will cause the chain to drive the assembly 130 in a direction to lock the races of the one-way clutch and rotate the upper circular knife. This action is necessary, as will be described hereinafter, when threading a strip of sheet metal through the circular knives 104 and 124 of the slitter, but is not necessary when the work piece is being drawn into the process line by the process apparatus.

Figure 7:
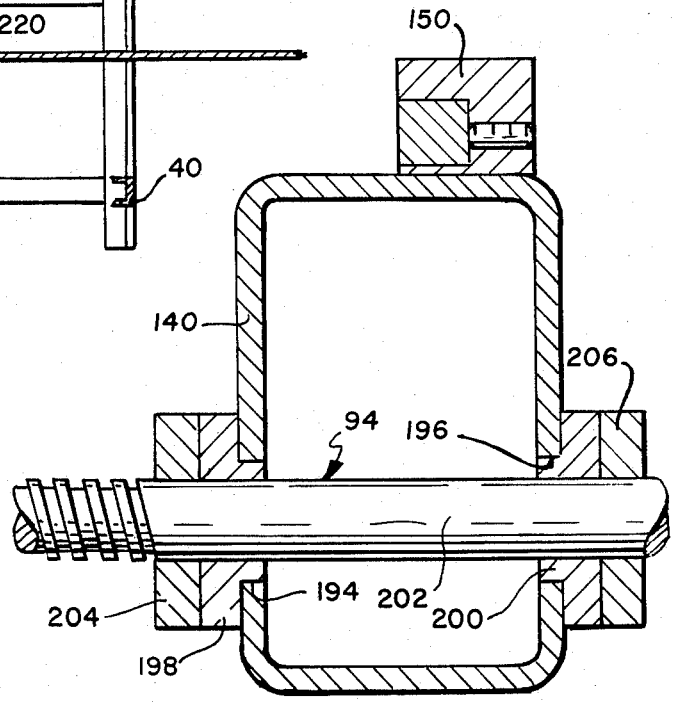
FIG. 7 is a fragmentary sectional view taken along the line 7—7 of FIG. 4.
Figure 3:
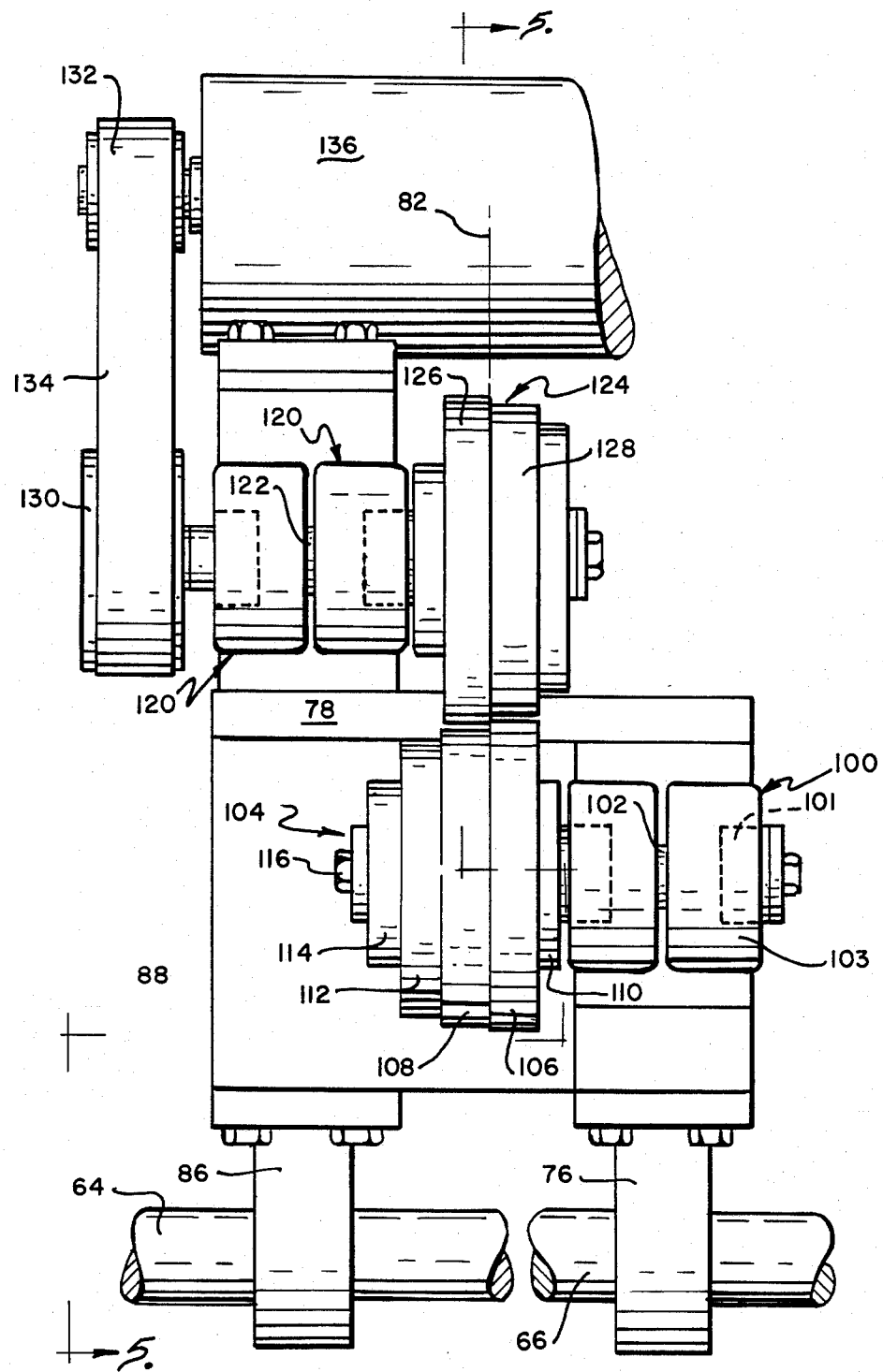
FIG. 3 is a sectional view taken along the line 3—3 of FIG. 2.
Figure 4:
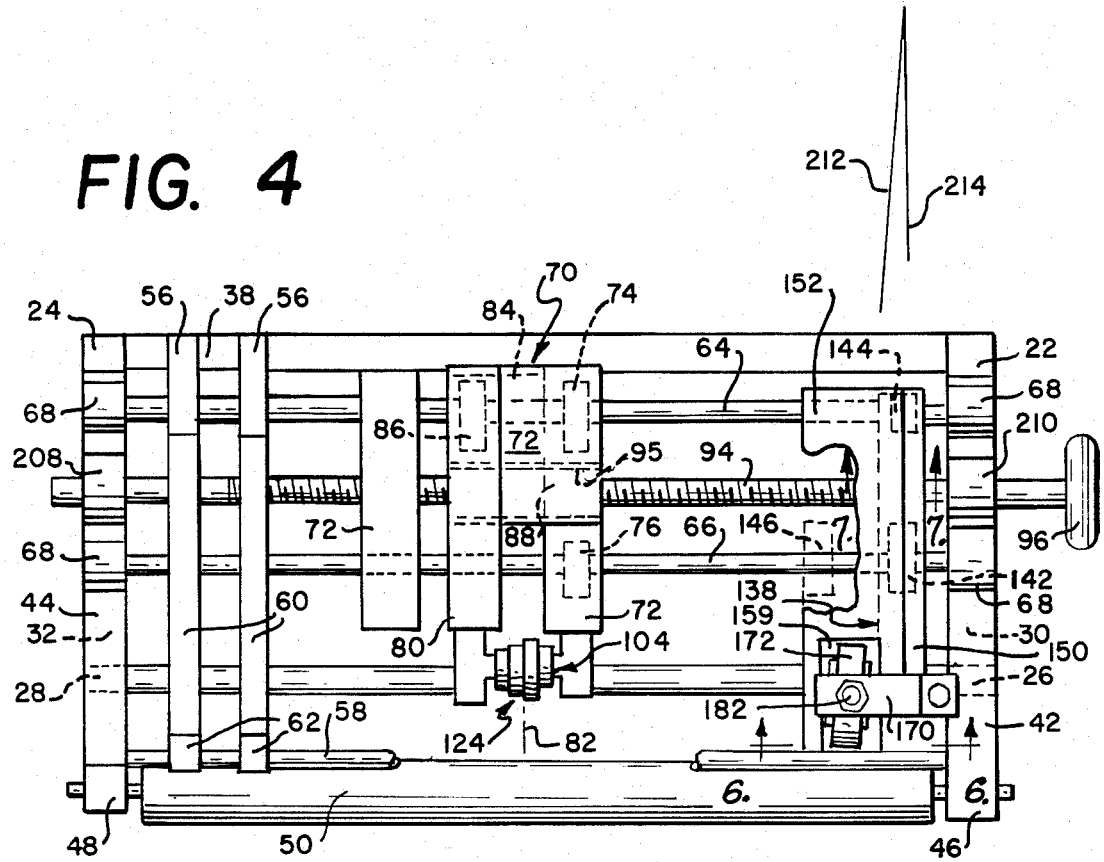
FIG. 4 is a plan view of the slitting table illustrated in FIG. 2 with certain supporting plates for the work piece removed for clarity.
Figure 8:
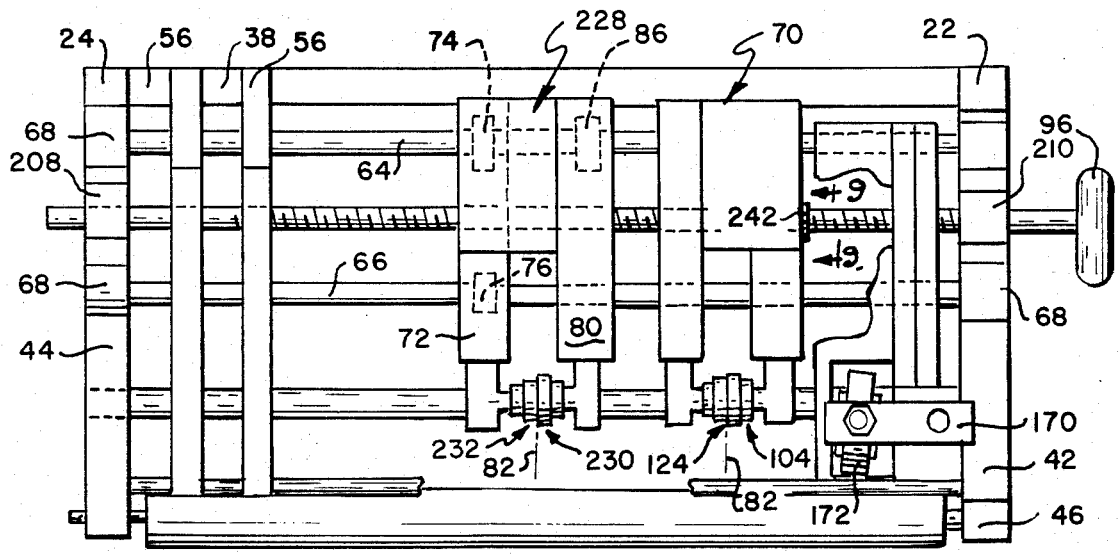
FIG. 8 is a plan view of a modified slitting table constructed according to the present invention provided with two cutting units.
Figure 5:
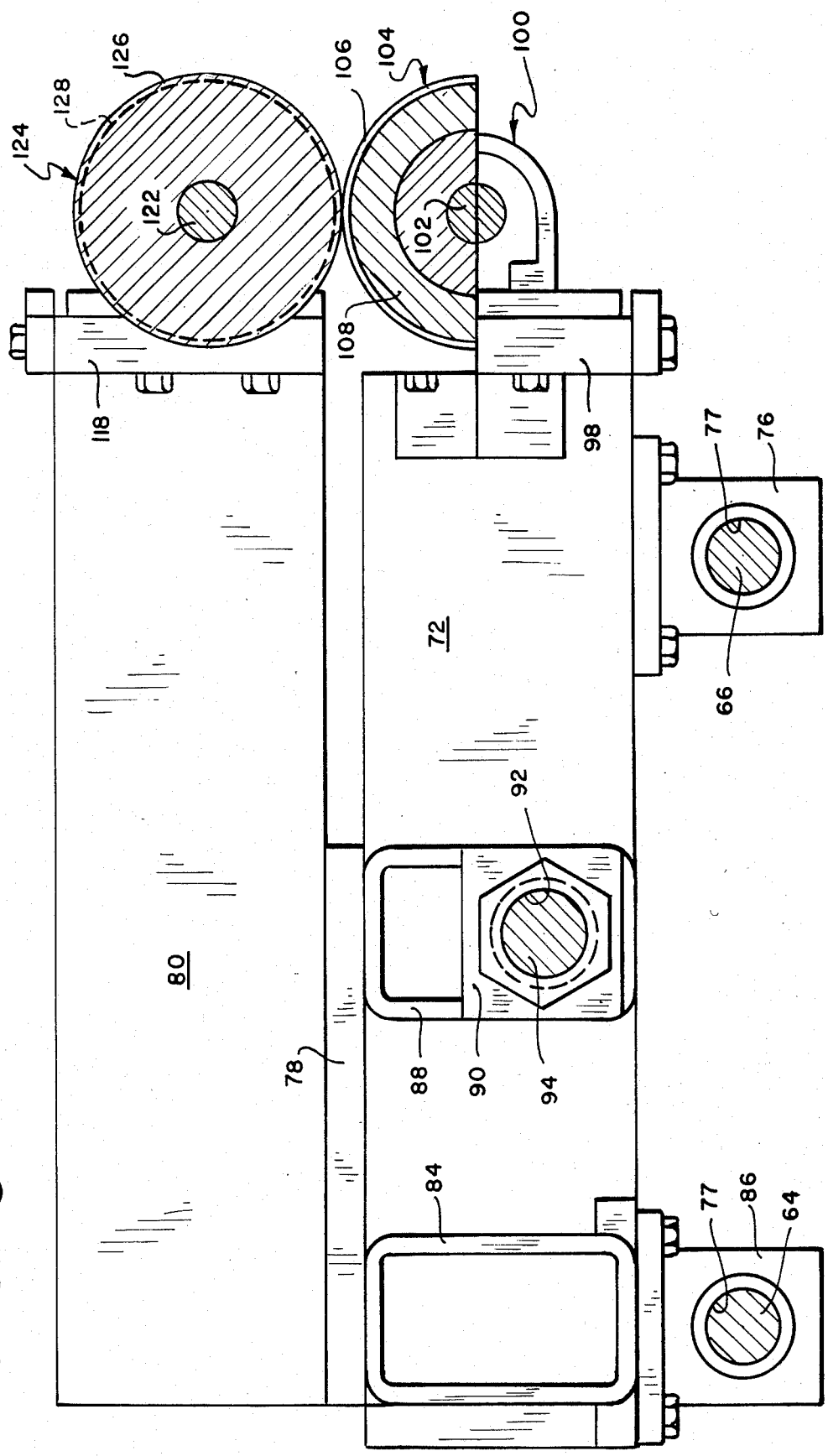
FIG. 5 is a sectional view taken along the line 5—5 of FIG. 4.
Figure 6:
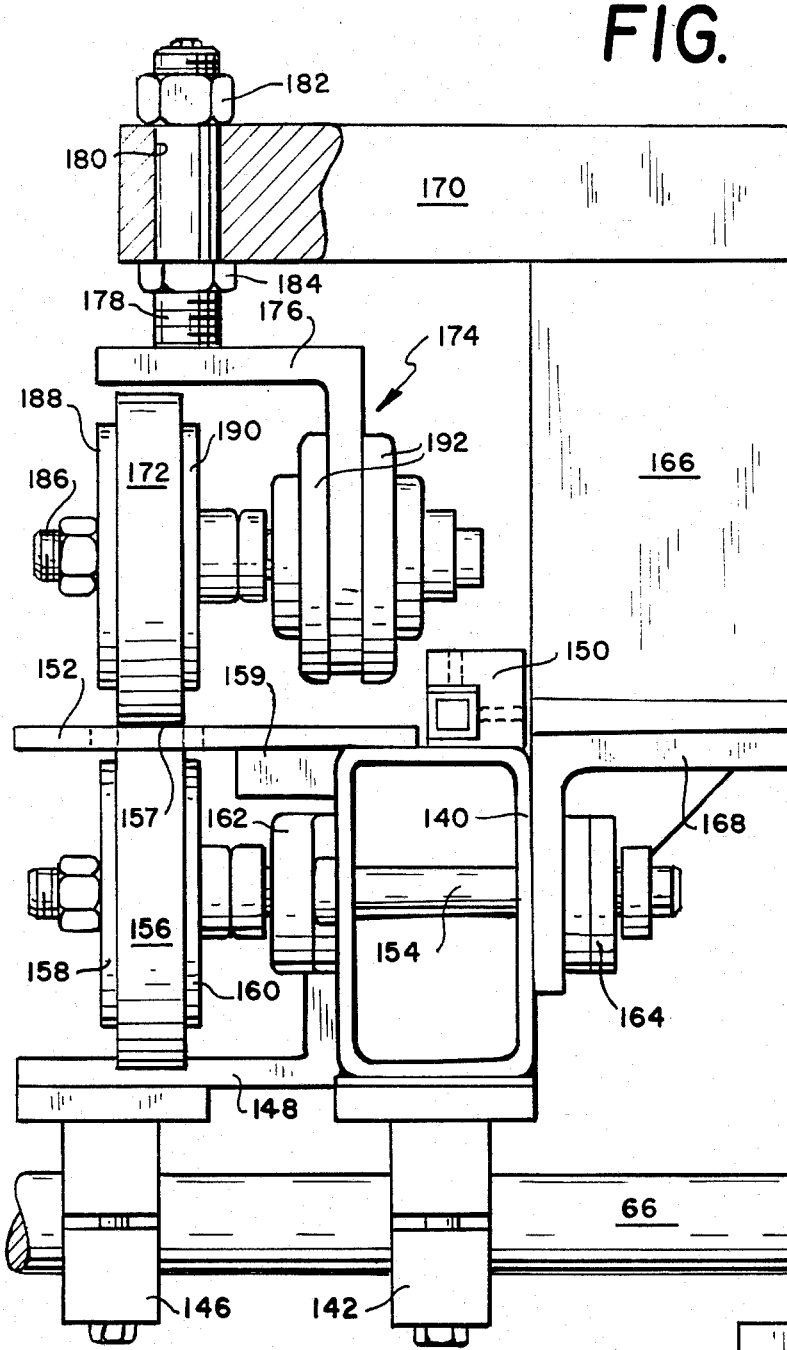
FIG. 6 is a sectional view taken along the line 6—6 of FIG. 4.

FIGS. 4, 6 and 7 illustrate the guide assembly 138 which assures the proper spacing between the edge of the elongated strip work piece and the cutting plane 82. The guide assembly has a hollow elongated rectangular tube 140 which carries two mounting blocks 142 and 144 on its lower surface, the mounting block 142 engaging the rod 66 and the mounting block 144 engaging the rod 64. A third mounting block 146 is also mounted on the rectangular tube 140 by an L-shaped bracket 148, and the third mounting block 146 also engages the rod 66 at a distance from the mounting block 142. The three mounting blocks 142, 144, and 146 thus mount the rectangular tube 140 for translation on the rods 64 and 66.

The upper surface of the tube 140 carries a straight elongated strip or guide 150 which forms a surface adapted to abut the edge of the work piece to be slit. A flat rectangular plate 152 is also mounted on the upper surface of the rectangular tube 140 and extends horizontally from the guide 150 toward the carriage 70. The plate 152 forms a portion of the horizontal surface for guiding the work piece through the slitter.

A shaft 154 is mounted on and extends horizontally through the rectangular tube 140 parallel to the rods 64 and 66. A disc 156 is mounted on the shaft 154 between two washers 158 and 160, and the shaft 154 is rotatably mounted on the rectangular tube by bearings 162 and 164 to permit the shaft to freely rotate with respect to the tube 140. The perimeter 157 of the disc 156 is cylindrical and extends through a slot 159 in the plate 152 to the upper side of the plate 152 to engage the work piece as it is transported across the slitter.

A hollow vertical rectangular tube 166 is mounted on one side of the tube 140 by means of a bracket 168 and an arm 170 extends from the vertical tube horizontally to confront the disc 156 from above. A wheel 172 is mounted on the arm 170 to confront the disc 156 by means of an adjustable mounting structure 174. The mounting structure 174 includes an angle bracket 176 which is mounted to the arm 170 by means of a threaded shaft 178 which extends through a channel 180 in the arm 170 and is locked in position by means of two engaging lock nuts 182 and 184. The wheel 172 is mounted on a shaft 186 between two supporting discs 188 and 190, and the shaft 186 is rotatably mounted on the depending arm of the angle bracket 176 by means of a pair of bearing assemblies 192.

As best illustrated in FIG. 7, the screw 94 extends perpendicularly through the rectangular tube 140. The rectangular tube 140 is provided with apertures 194 and 196 which are aligned on an axis normal to the axis of the tube 140. A bearing 198 is secured within the aperture 194 and a second bearing 200 is secured within the aperture 196. The screw 94 has a portion with an exterior surface free of threading, and this portion of the shaft designated 202 extends rotatably through the bearings 198 and 200. Discs 204 and 206 are secured on the portion 202 of the shaft 94, and these discs 204 and 206 abut the bearings 198 and 200, respectively, and maintain the screw 94 in a fixed translational position with respect to the rectangular tube 140.

The distance between the guide 150 and the cutting plane 82 determines the width of the strip that is cut from the work piece as it passes across the slitting table 18. That distance may be changed by rotating the wheel 96, thereby causing the threads on the screw 94 to translate the carriage 70 with respect to the guide assembly 138, the rectangular tube 140 being at a fixed translational position with respect to the screw 94.

The screw 94 is mounted at its ends on the arms 42 and 44 of the frame 20 by bearing blocks 208 and 210, the bearing blocks 208 and 210 permitting lineal translation of the screw 94 therein. Accordingly, both the carriage 70 and the guide assembly 138 are not restrained against translation, and the position of the carriage 70 and guide assembly 138 on the frame 20 is determined by the path of the work piece or elongated strip of sheet metal. Since elongated strips of sheet metal are seldom straight, the carriage 70 and guide 144 may respond to the movement to compensate for non-linearity and assure accurate slitting width.

The guide assembly 138 assures snug positioning of the edge of the work piece against the guide 150. The work piece is translated across the horizontal surface of the slitting table and engaged by the disc 156 and the wheel 172. While the disc 156 slightly raises the edge of the work piece above the surface of the slitting table 18 as established by the plate 152, the disc 156 rotates in the same direction of translation as the work piece. However, the angle of the wheel 172 with respect to the guide 150 is adjustable, and the wheel 172 is adjusted to an acute angle with respect to the guide 150, thereby causing the work piece to assume a direction between the planes of the disc 156 and the wheel 172. By positioning the wheel 172 at an acute angle with the plane of the disc 156, the wheel 172 will cause a forwardly moving work piece to be translated toward the guide 150. In FIG. 4, the plane of the wheel 172 is shown by the axis 212, and the axis of the guide 150 is shown by the axis 214. The angle between the plane of the wheel and the plane of the guide is thus shown by the angle between the axes 212 and 214, and in practice is of the order of 0 to 5 degrees, the intersection of the axis 212 and the axis 214 occurring downstream of the wheel 172.

As illustrated in FIGS. 1 and 2, the desired strip of sheet material produced by the rotary knives, designated 216, is transported onto the process line 10, and the slitting operation is achieved by power impressed upon the desired strip 216 to translate the work piece through the rotary knives 104 and 124. The remnant strip is designated 218, and this strip is directed downwardly from the carriage 70 between the rod 66 and the screw 94. A drum 220 is rotatably mounted on bearings 222 to cross beams 224 extending between the back legs 22, 24 and front legs 26, 28 of the frame 20, and the remnant strip 218 extends downwardly between the screw 94 and the rod 66 to pass about the perimeter of the drum 220. From the drum 220, the remnant strip 218 extends to a rewinder 226 where it is wound into a coil 227. If the remnant strip 218 is wider than the desired strip 216, it may be utilized for further production in the process line 10, either by mounting the coil 227 of the remnant strip 218 on the decoiler 14 and feeding the remnant strip through the rotary knives 104 and 124, or by reversing the direction of the decoiler 14 and transporting the remnant strip 218 from the rewinder 226 to the decoiler 14. Thereafter, the remnant strip 218 must be threaded through the rotary knives 104 and 124 by actuating the motor 136 for further processing. It is not necessary to remove all of the material on the coil 12 of the decoiler 14 before rewinding the coil 227 of the remnant strip 218 from the rewinder 226.

More than one carriage 70 may be employed in a single slitting operation to produce more than one desired strip. If two carriages are employed, a second desired strip for a same or a different processing line may be produced, and may simply be collected on a rewinder in the manner of the remnant strip 218. For some operations, it is desirable to remove both edges of the elongated strip in order to eliminate from the desired strip edge imperfections, such as uneven galvanization of sheet steel. In such cases, one edge may be collected on a scrap winder and the remnant strip collected on the rewinder for further use or processing.

Figure 9:
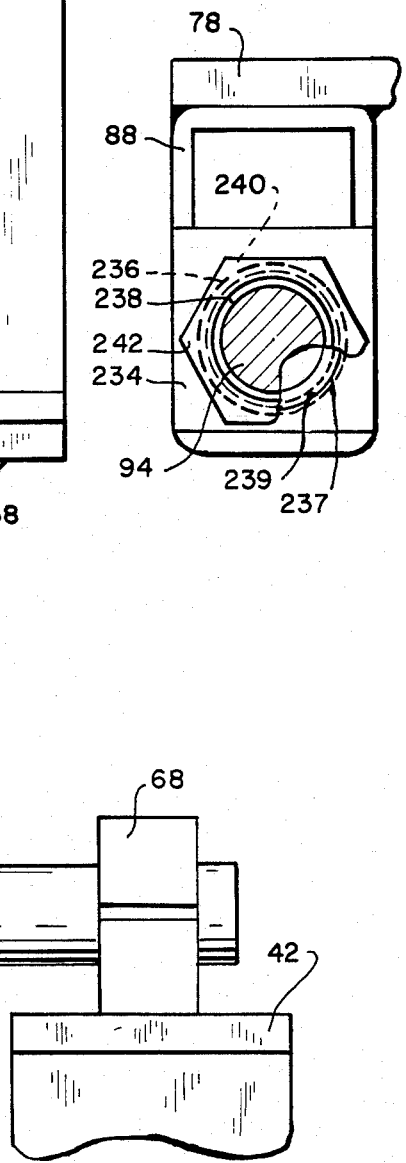
FIG. 9 is a fragmentary sectional view taken along the line 9—9 of FIG. 8.

FIG. 7 illustrates the stripper of FIGS. 1 through 6 provided with a second carriage 228 and rotary knives 230 and 232. The second carriage 228 is identical to the first carriage 70 except for the provision of means to adjust the position of the second carriage 228 with respect to the first carriage 70 on the rotatable screw 94. That means for adjustment is illustrated in FIG. 9. The rectangular tube 88 of the second carriage 228 is provided with a different nut plate 234 than employed by the first carriage 70. The nut plate 234 has an outer sleeve 236 which is mounted in fixed relation on the nut plate 234. The outer sleeve 236 has an inner cylindrical surface journaled about the cylindrical outer surface of an inner sleeve 238, and the inner sleeve 238 has a threaded inner channel which threadedly engages the screw 94. The inner sleeve 238 is maintained in fixed translational position with respect to the outer sleeve 236 by an outwardly extending collar 237 rotatably disposed in a circular groove 239 in the outer sleeve 236 and is provided with a hexagonal head 240. When the hexagonal head 240 is rotated, the inner sleeve rotates between the outer sleeve 236 and the screw 94, thereby translating the carriage 228 with respect to the carriage 70. When the outer sleeve 236 is in the proper position, it is locked in position by a lock nut 242 threadedly engaging the screw 94 to maintain the proper spacing.

From the foregoing specification, those skilled in the art will foresee many advantages and modifications to the slitting table disclosed. It is therefore intended that the scope of the present invention be not limited by the foregoing disclosure, but rather only by the appended claims.

The invention claimed is:

1. A device for slitting a narrow strip from a wider elongated strip of sheet material comprising, in combination:
   a frame having means defining a surface for supporting the elongated strip adapted to be horizontally disposed,
   a carriage,
   means for mounting the carriage on the frame for translation along an axis parallel to the surface of the frame,
   two shafts mounted on the carriage parallel to each other and in a plane normal to the surface of the frame, said shafts being disposed on opposite sides and parallel to the surface of the frame,
   a first circular knife mounted on one of said shafts and a second circular knife mounted on the other of said shafts, each of said circular knives being rotatable with respect to the frame, the first and second circular knives being disposed adjacent to a common plane normal to the two shafts and in cutting relation to each other,
   a linear guide disposed on the surface of the frame, said linear guide being adapted to abut the edge of the strip of sheet material when disposed on the surface of the frame,
   means for mounting the linear guide on the carriage, said mounting means including means for adjusting the distance between the guide and the common plane,
   and means mounted on the frame for maintaining the strip of sheet material against the linear guide.

2. A device for slitting a narrow strip from a wider elongated strip of sheet material comprising the combination of claim 1 in combination with means operatively associated with the strip of sheet material for translating the sheet material across the surface of the frame in a direction parallel to the linear guide.

3. A device for slitting a narrow strip from a wider elongated strip of sheet material comprising the combination of claim 1 wherein the carriage is mounted on the frame for free translation along an axis normal to the guide.

4. A device for slitting a narrow strip from a wider elongated strip of sheet material comprising the combination of claim 1 wherein the means for maintaining the strip of sheet material against the linear guide comprises a wheel rotatably mounted on the frame, said wheel having a perimeter disposed adjacent to the surface of the frame adapted to engage the elongated strip when on the surface of the frame, said wheel being disposed in a plane normal to the surface of the frame and at an acute angle to the linear guide.

5. A device for slitting a narrow strip from a wider elongated strip of sheet material comprising the combination of claim 4 in combination with a second wheel rotatably mounted on the frame and adapted to engage the elongated strip when on the surface of the frame, said second wheel being disposed in a plane normal to the surface of the frame on the side of the surface opposite the first wheel, said second wheel being at an angle to the linear guide no greater than the acute angle of the first wheel.

6. A device for slitting a narrow strip from a wider elongated strip of sheet material comprising the combination of claim 1 in combination with a pair of parallel rotatable rollers mounted on the frame parallel to the surface of the frame and normal to the linear guide, said rollers being spaced from the circular cutting knives and disposed adjacent to each other, said rollers being adapted to guide the elongated strip therebetween to position the strip flat on the surface of the frame.

7. A device for slitting a narrow strip from a wider elongated strip of sheet material comprising the combination of claim 1 wherein the means for mounting the carriage on the frame comprises a pair of parallel spaced rods mounted on the frame parallel to the surface, the carriage having bushings with channels conforming to the cross sections of the rods and slidably accommodating said rods.

8. A device for slitting a narrow strip from a wider elongated strip of sheet material comprising the combination of claim 7 wherein the means for mounting the linear guide on the carriage comprises a threaded screw threadedly engaging the carriage and disposed parallel to the rods, said screw being mounted on the linear guide and being rotatable with respect to the linear guide and the carriage, said screw being translatably fixed with respect to the linear guide.

9. A device for slitting a narrow strip from a wider elongated strip of sheet material comprising the combination of claim 8 wherein the linear guide and means for maintaining the strip of sheet material against the linear guide comprise an assembly, said assembly having an elongated rectangular tube, a pair of spaced mounting blocks mounted on and depending from a first flat side of the tube, said pair of mounting blocks having channels disposed on a first common axis normal to the tube and engaging one of the rods, a third mounting block mounted on the first side of the tube and spaced from the pair of mounting blocks, said third mounting block depending from the tube and having a channel disposed on a second axis parallel to the first common axis and engaging the other of the rods, the linear guide being mounted on a second side of the tube opposite the first side and being an elongated bar extending outwardly from the tube and having a flat side normal to the second side of the tube, a flat plate mounted on the second side of the tube and extending outwardly from the tube and the flat side of the elongated bar, said tube having a third side extending between the first and second sides of the tube opposite the flat plate, a bracket mounted on the third side of the tube and extending from the tube oppositely from the mounting blocks, said bracket having an arm extending normal to the bar over and confronting the flat plate, a first wheel, and means mounted on the arm for mounting the first wheel rotatably in a plane perpendicular to the flat plate, said means positioning the first wheel adjacent to the flat plate to engage the elongated strip when disposed on the plate, and said means for mounting the first wheel locking the first wheel at an acute angle to the bar.

10. A device for slitting a narrow strip from a wider elongated strip of sheet material comprising the combination of claim 9 wherein the flat plate is provided witn a slot confronting the first wheel, a second wheel, and means for rotatably mounting the second wheel on the tube, said second wheel extending through the slot and having a perimeter on the side of the flat plate opposite the tube, the perimeter of the second wheel confronting the perimeter of the first wheel, the first and second wheels being adapted to engage the elongated strip when disposed on the plate.

11. A device for slitting a narrow strip from a wider elongated strip of sheet material comprising the combination of claim 7 wherein the carriage comprises a rigid plate having two opposed parallel flat surfaces, a first and a second tube having a pair of opposed surfaces and an axis of elongation, the first of said tubes having one surface thereof mounted on one of the surfaces of the plate, the second of said tubes having one surface thereof mounted on the other flat surface of the plate, the axes of elongation of the first and second tubes being disposed parallel to a common plane disposed normal to the opposed surfaces of the plate, said first and second tubes extending outwardly from the plate and terminating on a common plane normal to the axes of elongation of the tubes, the two shafts being disposed parallel to the common plane of termination and mounted on the tubes adjacent to said common plane of termination.

12. A device for slitting a narrow strip from a wider elongated strip of sheet material comprising the combination of claim 11 wherein the carriage is provided with third tube having a pair of opposed surfaces and an axis of elongation, the one surface of the third tube being mounted on the one surface of the plate with the axis of elongation of the third tube normal to the axis of elongation of the first tube.

13. A device for slitting a narrow strip from a wider elongated strip of sheet material comprising the combination of claim 12 wherein the carriage has three bushings with channels accommodating the rods, two of said bushings being mounted on the other surface of the one tube of the pair of tubes and engaging the first rod, said bushings being spaced from each other, and the third bushing being mounted on the other surface of the third tube and spaced from the first tube.

14. A device for slitting a narrow strip from a wider elongated strip of sheet material comprising the combination of claim 13 wherein the first, second, and third tubes are rectangular, the surfaces of each pair being flat and parallel to each other.

15. A device for slitting a narrow strip from a wider elongated strip of sheet material comprising the combination of claim 12 wherein the carriage is provided with a fourth tube having an axis of elongation, said fourth tube being mounted on the one surface of the plate with the axis of elongation of the fourth tube being disposed parallel to the axis of elongation of the third tube and the fourth tube being spaced from the third tube.

16. A device for slitting a narrow strip from a wider elongated strip of sheet material comprising the combination of claim 15 wherein the means for mounting the linear guide on the carriage comprises a threaded screw disposed parallel to the rods, said screw being mounted on the linear guide and being rotatable with respect to the linear guide, said screw extending through the fourth tube of the carriage, in combination with a nut plate mounted on the fourth tube having a threaded channel disposed parallel to the axis of elongation of the fourth tube, said screw being rotatably disposed within the channel of the nut plate in threaded engagement therewith.

* * * * *